United States Patent [19]

Strange

[11] 4,053,900
[45] Oct. 11, 1977

[54] ELECTROGRAPHIC PRINTER RECORDING MEDIUM LOADING ASSEMBLY

[75] Inventor: Robert F. Strange, Round Rock, Tex.

[73] Assignee: Bausch & Lomb Incorporated, Rochester, N.Y.

[21] Appl. No.: 673,033

[22] Filed: Apr. 2, 1976

[51] Int. Cl.² .......................................... G01D 15/34
[52] U.S. Cl. .................................. 346/136; 346/145
[58] Field of Search ............... 346/136, 145, 155, 165

[56] References Cited

U.S. PATENT DOCUMENTS 2,524,564  10/1950  Gorham .......................... 346/136
2,646,337  7/1953  Gorham .......................... 346/145

*Primary Examiner*—George H. Miller, Jr.
*Attorney, Agent, or Firm*—Frank C. Parker; Bernard D. Bogdon

[57] ABSTRACT

A recording medium drive roller and a wrap roller are mounted to a cover for an electrographic printer and cooperate to enable the recording medium to be easily loaded into the printer when the cover is open, and to provide proper tension to the paper when the cover is closed to permit uniform and aligned feeding of the recording medium from the source during operation of the printer.

10 Claims, 3 Drawing Figures

ELECTROGRAPHIC PRINTER RECORDING MEDIUM LOADING ASSEMBLY

BACKGROUND OF THE INVENTION

1. Field of the Invention

This invention relates to an electrographic recorder cover assembly which includes a recording medium loading device, and particularly to a recording medium drive roller and wrap roller which cooperate to facilitate loading the recording medium into the electrographic printer.

2. Description of the Prior Art

In the past, loading of recording medium into an electrographic printer has generally been an awkward and cumbersome job which necessitated that the operator work and manipulate the recording medium in a blind area of the machine. Generally, the operator had to feed the recording medium between a number of rollers which he was required to manually hold out of the way of the recording medium. Frequently, the operator could never be sure that the recording medium was being fed between the rollers in a proper manner until he had completed the entire operation. Many times the loading operation was not successful and had to be repeated one or more times. Also, many of the recording medium loading devices known and used in the past did not provide that an even and constant force be exerted against the recording medium to insure that proper printing takes place thereon. The present invention is directed toward improving these operations.

DETAILED DESCRIPTION OF THE PREFERRED EMBODIMENT

Figure 1:
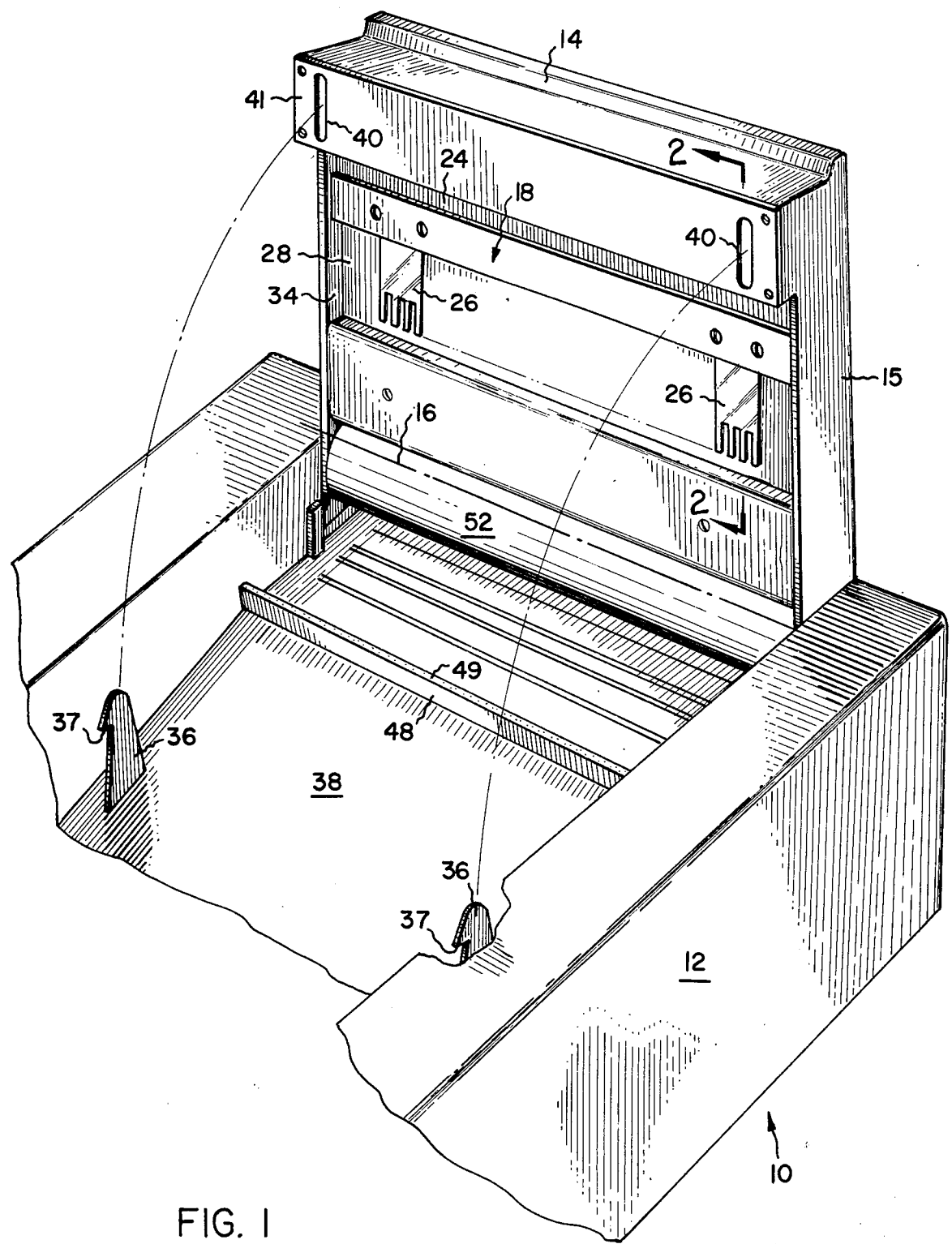
FIG. 1 is a partial perspective view of an electrographic printer with the cover in the open position showing the printing station and the paper loading surface according to the principles of this invention.

An electrographic printer 10 is shown in FIG. 1 which consists, essentially, of a main body or base portion 12 and a cover assembly 14. The cover assembly 14 is pivotally engaged to the main body portion 12 about an axis 16 and is pivotable thereabout from a first, or open, position to a second, or closed, position in readiness for printer operation.

Figure 2:
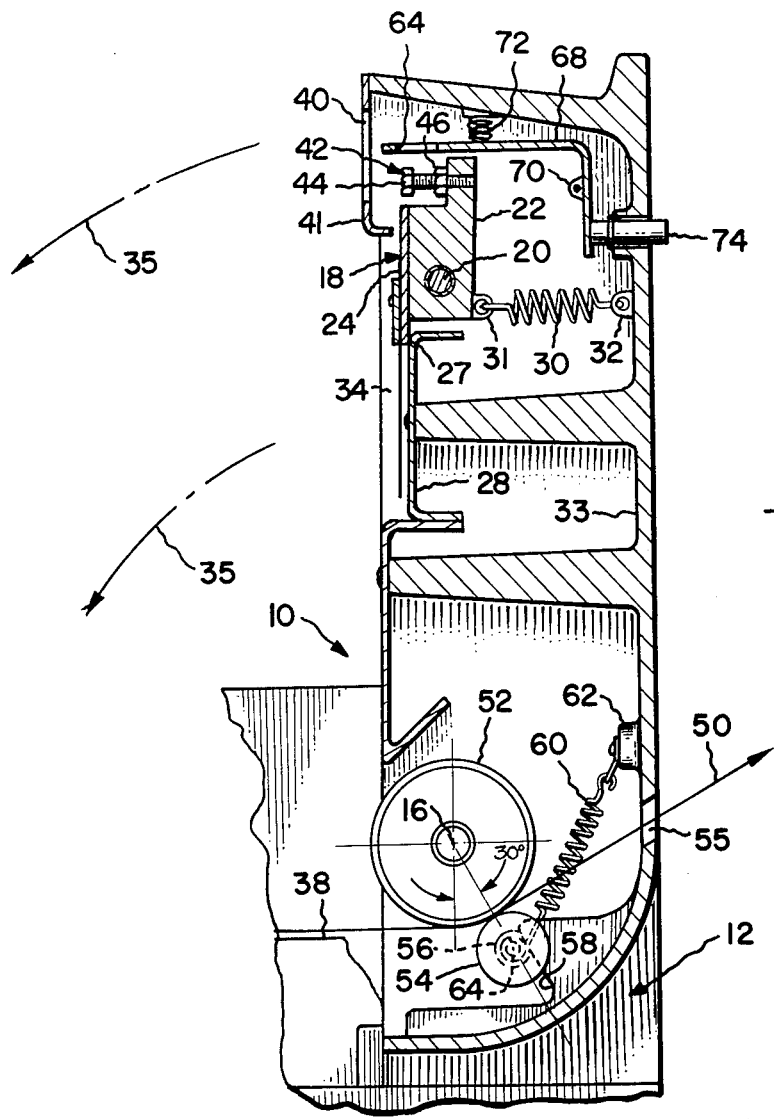
FIG. 2 is a sectional view taken along line 2—2 of FIG. 1.
Figure 3:
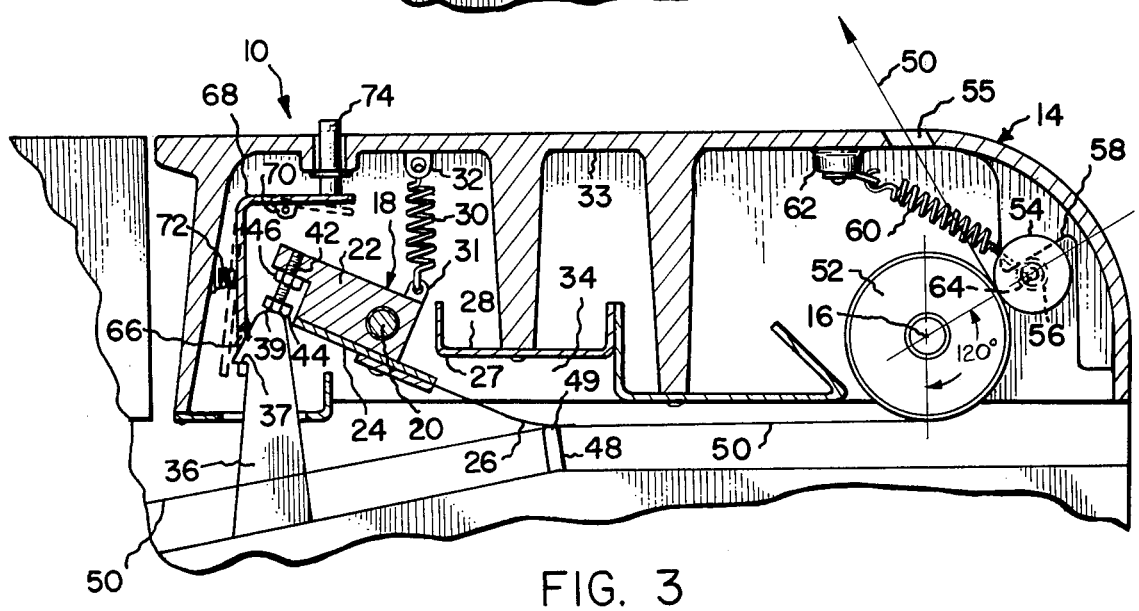
FIG. 3 is a sectional view similar to FIG. 2 showing the cover of the electrographic printer in a closed and operative position.

A segment electrode assembly 18 is pivotally mounted in the cover member 14 about axis pin 20, as best seen in FIGS. 2 and 3, and is essentially comprised of a rigid mounting board 22, a printed circuit driver board 24 mounted thereto and a plurality of segment electrode units 26 which are engaged to the driver board 24 and extend outwardly therefrom. The illustrated and disclosed segment electrode assembly of concurrently filed and copending patent application Ser. No. 673,029 entitled "Electrographic Segment Electrode Clamping Assembly" is satisfactory for application to the present embodiment. The segment electrode units each comprise a plurality of fingers which are thin and quite flexible.

When the cover 14 of the electrographic printer 10 is in an open position, as best seen in FIGS. 1 and 2, the segment electrode assembly 18, and specifically the driver board 24 of the segment electrode assembly 18, is held inward and, for example, against a stop surface 27 of a recessed plate 28 which is dictated by the force from a spring 30 extending from a mount 31 on the board 22 to a complementing mount 32 on the inside surface 33 of the cover 14. The plurality of segment electrode fingers 26 are, thus, disposed in a protective recessed area 34.

A pair of cover latch members 36 protrude upwardly from surface 38 of the main body portion 12 of the printer 10 and, as the cover member 14 is pivoted toward its closed position in the direction of curved arrows 35, each protruding latch member 36 passes through an accommodating slot-shaped aperture 40 formed in a face plate 41 at the underside of the cover member 14. Once each latch member 36 is through its respective slot the cover assembly 14 is locked and the segment electrode assembly 18 is set in place so that the printing operation may take place.

Mounted behind the cover plate 41 and within the cover member 14, is the rigid mounting board 22 which has at least one threaded adjusting screw affixed thereto in such a manner that the head 44 of the screw 42 engages the latch member 36 when the cover 14 is in the closed position. A lock nut 46 is affixed to the screw 42 so that once the segment electrode assembly 18 is disposed before a stylus board 48 the distance between the screw head 44 and the latch member 36 can be set by locking the nut 46. With the adjustment set, the rounded top portion 39 of latch member 36 engages the mounting board 22 before the cover member 14 is fully closed. The force of the latch member 36 against the screw head 44 overcomes the tension exerted by spring 30 and causes the entire segment electrode assembly 18 to pivot about axis pin 20 toward the facing surface 38 of the main body portion 12.

It is obvious that the segment electrode fingers 26 do not make direct contact with the stylus board 48 when the printing process is taking place. A length of recording paper 50 is distributed from a paper storage bin over the selectively energized stylus at the surface 49 of the stylus board 48. When the cover 14 is closed, the paper 50 is engaged between the segment fingers 26 and the stylus board 48.

In loading paper 50, as in the embodiment illustrated, the cover 14 is opened and a sufficient supply of paper is placed in the storage bin. The paper supply may be either in roll form or in Z-fold form. When the paper supply is depleted, new paper is inserted and a length of the recording paper 50 is drawn up out of the storage bin, while the cover is open, between the cover latch members 36 across the conductive styli surface 49 of stylus board 48 and up to the area where a paper drive roller 52 and a wrap roller 54 contact each other, as best seen in FIGS. 2 and 3. The paper 50 is substantially aligned by positioning the paper at the line of contact between the drive roller 52 and the wrap roller 54. When the paper 50 has been aligned, the drive roller 52 is energized momentarily by the operator through a switch and electrical stepper motor until such a time that the paper 50 is caused to pass between the two rollers. When the paper 50 is fully disposed between the drive roller 52 and the wrap roller 54, the cover 14 can then be closed.

It will be noted that when the cover 14 is in the up position, as best seen in FIG. 2, and the paper 50 is initially mildly urged between the drive roller 52 and the wrap roller 54 to touch both of the rollers just at their point of contact. Afterwards, but during the loading process, it is driven farther between the rollers. The paper is thereafter exited from slot 55 of cover 14. The paper 50 is initially engaged about the drive roller 52 for a surface angle of approximately 30°. Thereafter, when the cover 14 is rotated to its closed position, as best seen in FIG. 3, the paper 50 is caused to wrap around the drive roller 52, because of the action of the wrap roller 54, to engage a surface angle of approximately 120 degrees. By having the paper 50 in contact with the drive roller 52 for an arc of approximately 120 degrees, the drive roller 52 is able to exert an even force on the paper 50 while not overriding any other recording medium alignment device, such as the one illustrated in U.S. patent application Ser. No. 625,995

The wrap roller 54 is supported by the cover 14 in such a way that it is free to move and stay in contact with the drive roller, or the paper therebetween, and find its own centering point while cooperatively operating with the drive roller 52. The wrap roller 54, for instance, may be mounted to a pair of bearing assemblies 56 which in turn would mount at each end to a typical ramp structure 58, formed as part of the cover 14 and which act as bearing surfaces. A pair of springs 60, one of which is shown, extend between a mount 62 on the cover and a stub shaft 64 of the bearing assembly 56 concentric with the wrap roller 54. The wrap roller 54, in this configuration rotates very little on the ramp, or bearing, surface 58 for rotation is designed to occur about the bearings 56. The ramp surface 58 allows the wrap roller 54 to move toward or away from the drive roller 52 and, therefore variations between the concentricity of rollers, 52 and 54 and paper thickness is compensated for automatically. The spring 60, in cooperation with the wrap roller 54, exerts tension on the paper 50 which cooperatively operates to tension and aid in aligning the recording paper with a recording medium system such as is described in U.S. patent application Ser. No. 625,995. Also, the spring tensioned wrap roller 54 contributes greatly toward making the system extremely easy to operate. The operator, as explained earlier, merely inserts the paper 50 between the rollers 52 and 54 and then energizes the drive roller 52 until the paper 50 is drawn between them. The cover 14 is then closed and the process of electrographic printing can take place.

For safety of operation as well as for other obvious reasons, the cover 14 should not be opened while the printing process is taking place. A suitable electrical interlock and a latching means, as disclosed herein, for instance, can readily be provided. For example, each of the protruding latch members 36 may have a hooked portion 37 formed thereon which are received in complementing openings 66 of catch member 68 of the cover 14. The catch members 68, for example, may be affixed to the cover member 14 at a pivotable connection 70. Suitable apparatus, such as a typical spring 72, may be used to bias the catch member 68 so that it remains engaged to the hooked portion 37 of the protruding member 36 when the cover 14 is closed. Buttons 74, only one of which is typically illustrated, are arranged to cooperate between the exterior surface 15 of the cover member 14 and the catch member 68. By pushing the buttons 74, the force of each spring 72 is overcome and the catch member 68 is caused to pivot at the pivotable connection 70, thereby releasing it from the hooked portion 37 of the protruding member 36.

The cover 14 can then be opened. In the disclosed configuration the cover 14 can only be opened by design and not by accident. A spring such as spring 30, or other suitable means, can be mounted to the electrographic printer base 12, or to the cover 14 thereof so that when the buttons 74 are pressed to release latch 68, the cover is forced upwardly a small amount. This aids the operator in opening the cover to load or inspect the printer.

An electrical switch, not shown, could, for instance, be incorporated into the cover 14 to cooperate with the catch member 68 so that when the catch member is released from the hooked portion 37 of the protruding member 36, all high voltage electrical energy is shut off to operational apparatus inside the cover. Any potential for injury, which could be caused to a person who accidentally contacts some electrical area, is thereby eliminated. Such an interlock prevents electrical energy from being supplied to the assembly within the cover 14 unless the cover is closed. consequently, the possibility of a person receiving an electrical shock is greatly reduced.

A preferred embodiment of the invention, has been shown and described, but it should be obvious to any skilled in the art that various modifications and/or changes can be made thereto without departing from the spirit or scope of the invention as claimed therein.

It is claimed:

1. An electrographic printer recording medium loading assembly, comprising:
    an electrographic printer cover structurally defining a ramp member;
    a drive roller mounted to the printer cover;
    a length of recording medium disposable to tangentially approach and engage the drive roller and be driven thereby;
    a wrap roller bearing against and movable along the ramp member having first and second roller positions for cooperatively engaging the recording medium with the drive roller, the first and second roller positions being disposed in an arcuate path about the periphery of the drive roller; and
    at least one extension spring extending between the printer cover and the wrap roller to bias the wrap roller against the ramp member and against the recording medium engaging the drive roller.

2. The electrographic printer recording medium loading assembly, as defined in claim 1, wherein a plurality of ramp member are provided.

3. An electrographic printer recording medium loading assembly, comprising:
    an electrographic printer cover having disposed on the underside thereof a pair of ramp members;
    a drive roller mounted to the printer cover;
    a length of recording medium disposable to tangentially approach and engage the drive roller and be driven thereby; and
    a wrap roller the opposite ends of which are respectively received by the pair of ramp members to be movable therealong, said wrap roller disposed to force the recording medium against the drive roller at a first location with respect to the initial contact of the recording medium with the periphery of the drive roller, when the printer cover is open, and to maintain the recording medium against the drive roller to a second location with respect to the initial contact of the recording medium with the drive roller, when said cover is in the closed position.

4. An electrographic printer recording medium loading assembly, comprising:
  an electrographic printer cover including a ramp carried within said printer cover;
  a drive roller within the printer cover for frictionally engaging and moving a recording medium from a loading station across a printing station and outward from the electrographic printer; and
  a wrap roller bias mounted to said electrographic printer cover at said ramp by at least one extension spring engaging and extending between said wrap roller and said printer cover for the wrap roller to maintain the recording medium in contact with the periphery of the drive roller, when the printer cover is open, at a first station the location of which is definable by the locus of the extremity of a first circumferential arc extending along the surface of the drive roller from a line of initial contact of the recording medium with the drive roller and further to maintain engagement of the recording medium against the drive roller, when the printer cover is closed, to a second station definable by the locus of the extremity of a second circumferential arc greater than the first arc extending along the surface of the drive roller from the point of initial contact of the recording medium with the drive roller.

5. A method of threading electrographic recording medium in an electrographic printing apparatus, comprising the steps of:
  opening a cover of the electrographic printing apparatus to gain access to a printing and development station and a recording medium storage compartment;
  inserting recording medium into the storage compartment;
  feeding the recording medium across an area including the printing and development station;
  maintaining a bias force to pull the outside surface of a bias mounted wrap roller into engagement with a portion of the outside surface of a drive roller;
  inserting the electrographic medium between the drive roller and the bias mounted wrap roller to thereby dispose the recording medium upon a first portion of an outside surface of the drive roller;
  electrically energizing the drive roller to force the recording medium between it and the wrap roller; and
  closing the printer cover to thereby distribute the recording medium upon a second portion greater than the first portion of the outside surface of the drive roller to set the recording medium at the printing station so that the recording medium can be driven through the printer as electrographic printing takes place.

6. Apparatus for use in a movable cover of an electrographic printer for carrying a segment electrode assembly and for facilitating the loading of electrographic recording medium, comprising:
  a segment electrode assembly;
  support means for pivotally mounting the segment electrode assembly to the electrographic printer cover;
  biasing means for maintaining said segment electrode assembly in a first protected and inoperative position when said printer cover is in an open position;
  loading means mounted to the printer cover to engage a portion of said recording medium to facilitate the loading thereof when said cover is open and to further engage a greater portion of the recording medium when the cover is closed; and
  actuating means for moving said segment electrode assembly from the first protected and inoperative position to a second operative position when said cover is closed.

7. The apparatus as defined in claim 6, wherein said loading means comprise first and second rollers axially mounted in said cover.

8. The apparatus as defined in claim 7, wherein the first roller is electrically energized to rotate about its axis.

9. The apparatus as defined in claim 8, wherein the second roller includes means attached thereto for resiliently biasing the second roller against the periphery of the first roller.

10. The apparatus as defined in claim 9, wherein said means for resiliently biasing is at least one spring extending between said second roller and said cover.

* * * * *